US010867044B2

(12) United States Patent
Soby et al.

(10) Patent No.: US 10,867,044 B2
(45) Date of Patent: Dec. 15, 2020

(54) AUTOMATIC COMPUTER SYSTEM CHANGE MONITORING AND SECURITY GAP DETECTION SYSTEM

(71) Applicant: AppOmni, Inc, San Bruno, CA (US)

(72) Inventors: Brian Soby, Portsmouth, NH (US); Brendan O'Connor, San Bruno, CA (US)

(73) Assignee: AppOmni, Inc., San Bruno, CA (US)

( * ) Notice: Subject to any disclaimer, the term of this patent is extended or adjusted under 35 U.S.C. 154(b) by 166 days.

(21) Appl. No.: 15/993,303

(22) Filed: May 30, 2018

(65) Prior Publication Data

US 2019/0370468 A1 Dec. 5, 2019

(51) Int. Cl.
*G06F 21/57* (2013.01)
*G06F 21/56* (2013.01)

(52) U.S. Cl.
CPC ............ *G06F 21/57* (2013.01); *G06F 21/566* (2013.01); *G06F 2221/034* (2013.01)

(58) Field of Classification Search
CPC .. G06F 21/57; G06F 21/566; G06F 2221/034; H04L 63/20; H04L 63/107; H04L 63/1433; H04L 63/08; H04W 12/08
See application file for complete search history.

(56) References Cited

U.S. PATENT DOCUMENTS

| | | | | |
|---|---|---|---|---|
| 7,730,042 | B2 | 6/2010 | Devarakonda | |
| 8,104,080 | B2 | 1/2012 | Burns | |
| 8,122,500 | B2 * | 2/2012 | Dawson | H04L 63/20 726/22 |
| 8,185,548 | B2 | 5/2012 | Lim | |
| 8,260,893 | B1 | 9/2012 | Bandhole | |
| 8,307,404 | B2 | 11/2012 | Vinberg | |
| 8,352,593 | B2 | 1/2013 | Uttamchandani | |
| 8,689,333 | B2 * | 4/2014 | Aziz | H04L 63/1491 726/24 |
| 8,832,048 | B2 | 9/2014 | Lim | |
| 8,949,825 | B1 | 2/2015 | Fitzgerald | |
| 8,949,826 | B2 | 2/2015 | Fitzgerald | |
| 9,043,480 | B2 | 5/2015 | Barton | |
| 9,069,599 | B2 | 6/2015 | Martinez | |
| 9,081,981 | B2 | 7/2015 | Lim | |
| 9,124,636 | B1 * | 9/2015 | Rathor | H04L 63/20 |
| 9,170,833 | B2 | 10/2015 | Fitzgerald | |
| 9,171,172 | B2 | 10/2015 | Goldschlag | |
| 9,384,360 | B2 | 7/2016 | Lim | |

(Continued)

FOREIGN PATENT DOCUMENTS

| | | |
|---|---|---|
| AU | 2015221443 B2 | 3/2016 |
| WO | 2013103989 | 7/2013 |

*Primary Examiner* — Techane Gergiso
(74) *Attorney, Agent, or Firm* — Blueshift IP, LLC; Robert Plotkin

(57) ABSTRACT

A computer system analyzes the state of a computer system to determine whether that state violates one or more security goals from a particular perspective, such as a particular user account or role. The system takes into account a combination of access rights, permissions, and entitlements to determine whether the state of the computer system violates any of the security goals. In response to determining that at least one of the security goals is violated, the computer system may change the state of the computer system so that it no longer violates the security goals, or prevent the computer system from being put into that state.

26 Claims, 2 Drawing Sheets

(56) References Cited

U.S. PATENT DOCUMENTS 9,444,848 B2 * 9/2016 Green .................... H04L 63/20
9,531,595 B2 12/2016 Lim
9,563,771 B2 2/2017 Lang
2004/0117624 A1 * 6/2004 Brandt ................. H04L 69/329 713/166
2005/0193430 A1 * 9/2005 Cohen .................. G06F 21/577 726/25
2006/0037000 A1 2/2006 Speeter
2006/0143144 A1 6/2006 Speeter
2006/0179116 A1 8/2006 Speeter
2007/0061125 A1 3/2007 Bhatt
2007/0143827 A1 * 6/2007 Nicodemus ........... H04L 63/102 726/2
2007/0143851 A1 * 6/2007 Nicodemus ........... H04L 63/105 726/25
2007/0150934 A1 * 6/2007 Fiszman ............. H04L 63/1425 726/1
2007/0180490 A1 * 8/2007 Renzi ................... H04L 63/145 726/1
2011/0246504 A1 10/2011 Slater
2013/0031037 A1 * 1/2013 Brandt ............... H04L 63/1416 706/12
2014/0123257 A1 * 5/2014 Gordon .............. H04L 67/1095 726/7
2014/0380415 A1 * 12/2014 Wang ................... H04L 43/026 726/1
2015/0180894 A1 * 6/2015 Sadovsky ............ G06F 3/0481 726/22
2016/0014156 A1 * 1/2016 Roosli .................... H04L 63/20 726/1
2017/0060653 A1 * 3/2017 Nandakumar ........ G06F 11/079
2017/0286673 A1 10/2017 Lukacs
2017/0329966 A1 * 11/2017 Koganti ............... G06F 21/554
2019/0036978 A1 * 1/2019 Shulman-Peleg ....... G06F 21/53
2019/0253456 A1 * 8/2019 Wang ................... H04L 63/083

* cited by examiner

AUTOMATIC COMPUTER SYSTEM CHANGE MONITORING AND SECURITY GAP DETECTION SYSTEM

BACKGROUND

Current techniques for administering computer systems, particularly computer systems which execute on-demand, cloud-based, or Software as a Service (SaaS) software applications, often lead to gaps in security which expose the system's resources to unauthorized parties. Such security gaps result from a variety of causes, including changes to complex configurations of such systems, where the security implications of such changes may not be readily apparent to system administrators until after the fact and damage already has been done, such as when a security breach has been identified. Incorrect changes to system configurations may, for example, allow unauthorized parties to obtain access to sensitive features or to cause enterprise policies to be violated, such as by provisioning or deprovisioning key security features.

What is needed, therefore, are techniques for avoiding such security gaps.

SUMMARY

A computer system analyzes the state of a computer system to determine whether that state violates one or more security goals from a particular perspective, such as a particular user account or role. The system takes into account a combination of access rights, permissions, and entitlements to determine whether the state of the computer system violates any of the security goals. In response to determining that at least one of the security goals is violated, the computer system may change the state of the computer system so that it no longer violates the security goals, or prevent the computer system from being put into that state.

Other features and advantages of various aspects and embodiments of the present invention will become apparent from the following description and from the claims.

DETAILED DESCRIPTION

Figure 1:
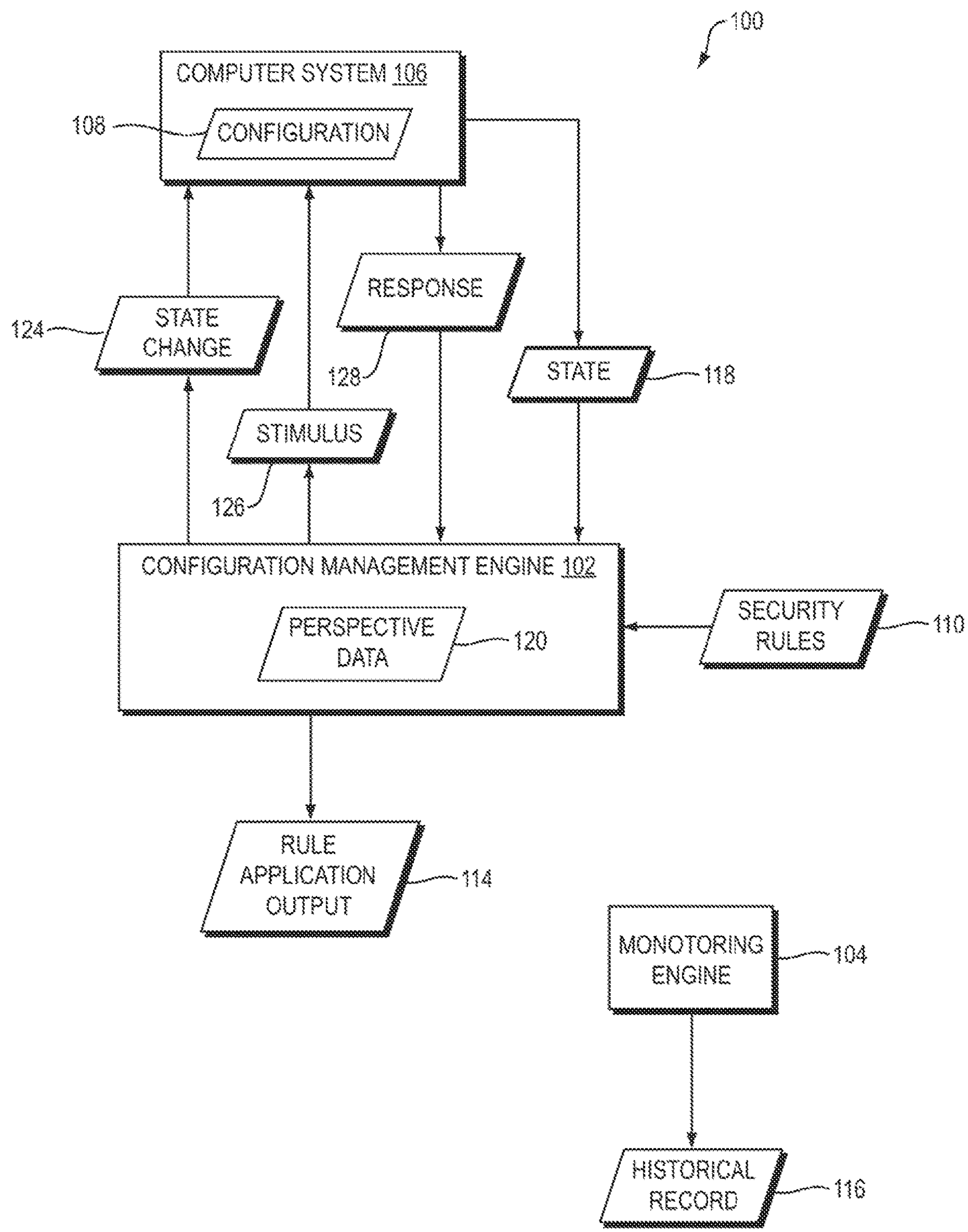
FIG. 1 is a dataflow diagram of a system for automatically managing and monitoring changes in a configuration of a computer system and for detecting and preventing any such changes which may create security gaps in the computer system according to one embodiment of the present invention.
Figure 2:
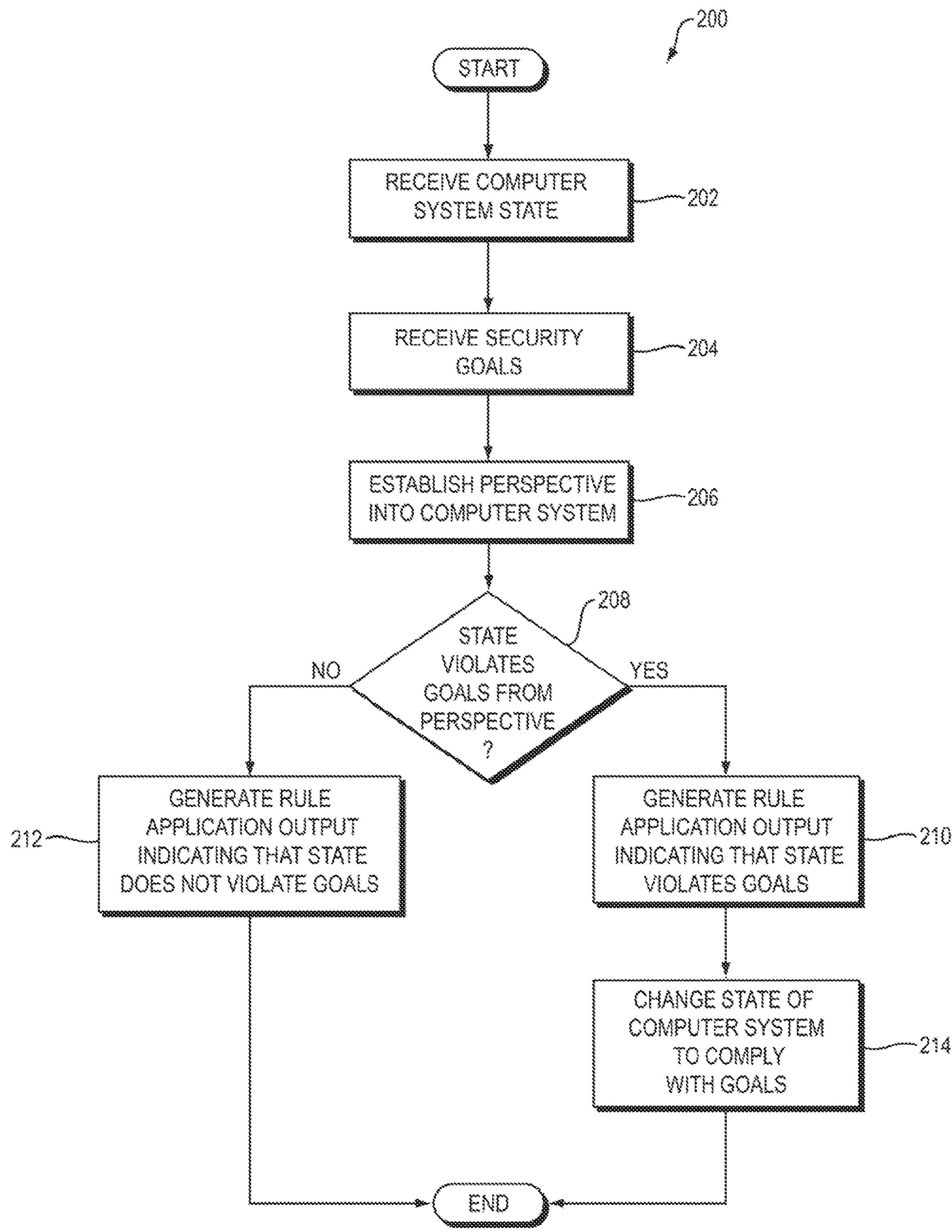
FIG. 2 is a flowchart of a method performed by the system of FIG. 1 according to one embodiment of the present invention.

Referring to FIG. 1, a dataflow diagram is shown of a system 100 for automatically managing and monitoring changes in a configuration 108 of a computer system 106 and for detecting and preventing any such changes which may create security gaps in the computer system 106. Referring to FIG. 2, a flowchart is shown of a method 200 that is performed by the system 100 of FIG. 1 according to one embodiment of the present invention.

The computer system 106 may be any kind of computer system, and may include one or more computing devices. As used herein, the term "computer" or "computing device" refers to any device which includes at least one processor and one memory, in which instructions may be stored in the memory/memories and executed by the processor(s). Examples of computing devices include, but are not limited to, servers, desktop computers, laptop computers, tablet computers, smartphones, wearable computing devices (e.g., smart watches), and appliances having at least one processor and memory in the manner just described. As used herein, the term "computer system" refers to any one or more computing devices, whether or not such computing devices are connected to each other or interoperate with each other. A computer system, therefore, as that term is used herein, may consist of a single computing device. A computer system, as that term is used herein, may include one or a plurality of computer systems.

Any computer system (e.g., computing device) in a computer system (such as the computer system 106) may be connected to one or more other computer systems (e.g., computing devices) within the same computer system and/or other computer systems. Any such connection may, for example, be a direct connection, such as via a bus, cable, or direct wireless connection, or be a connection over a (wired and/or wireless) network, such as a Local Area Network (LAN) or Wide Area Network (WAN) (such as a private intranet or the public Internet). A single computer system may include any number of such connections in any combination. Computing systems (e.g., computing devices) within a computer system (such as the computer system 106) may communicate with other computer systems (e.g., computing devices) (in the same computer system and/or in other computer systems) using any known method of communication. Although only one computer system 106 is shown in FIG. 1 for ease of illustration, the system 100 of FIG. 1 may include any number of computer systems, which may or may not be connected with each other in any of the ways disclosed herein. As a result, any features of the computer system 106 disclosed herein are equally applicable to other computer systems which may be contained in the system 100.

The computer system 106 has a configuration 108. Although the configuration 108 is shown in FIG. 1 as being contained within the computer system 106 as an example, this is not a limitation of the present invention. More generally, the configuration 108 may be fully contained within the computer system 106, partially contained within the computer system 106 and partially be outside of the computer system 106, or be solely outside of the computer system 106. As will be described in more detail below, the configuration 108 contains data representing one or more parameters of the computer system 106 and associated values, and may take a wide variety of forms.

In general, the system 100 of FIG. 1 includes a configuration management engine 102 and a monitoring engine 104. Various features of the configuration management engine 102 and the monitoring engine 104 will be disclosed in detail herein. In general, the purpose of the configuration management engine 102 is to analyze the configuration 108 and actual/potential changes to the configuration 108, and to evaluate the impact of such changes on the security of the computer system 106 and/or the system 100 as a whole. In general, functions performed by the monitoring engine 104 include detecting changes in the configuration 108 that were not detected by the configuration management engine 102, to create a record of changes to the configuration 108, to enable effects of a change to the configuration 108 to be calculated, to compare the results of assessments of related computer systems, and to retroactively assess the configuration 108 and/or computer system 106 based on new information.

Various references will be made herein to analyzing the computer system 106 and/or the configuration 108. Any reference herein to analyzing or performing any other function in connection with the computer system 106 should be understood to encompass any one or more of the following: (1) performing that function solely on the configuration 108; (2) performing that function solely on elements of the computer system 106 other than the configuration 108; and (3) performing that function on both the configuration 108 and on elements of the computer system 106 other than the configuration 108. Any reference herein to analyzing the computer system 106 or performing any other function on the computer system 106 should be understood to encompass instances in which that function is performed on the entire computer system 106 and instances in which that function is performed only on a subset of the computer system 106, such as the configuration 108 or a subset of the configuration 108.

Any reference herein to analyzing or performing another function on the computer system 106 should be understood to refer both to instances in which that function is performed on the current state of the computer system 106 and to instances in which that function is performed on a potential (e.g., proposed) future state of the computer system 106. Any reference herein to analyzing or performing another function on a "change" or "modification" to the computer system 106 should be understood to refer both to instances in which that function is performed on an actual change that already has been made to the computer system 106 and to instances in which that function is performed on a potential (e.g., proposed) future change to the computer system 106, such as by simulating that future change to the computer system 106 without implementing that future change to the computer system 106, and performing the function (e.g., analysis) on the simulated state resulting from simulating the future change.

The system 100 also includes a set of security goals 110. As will be described in more detail below, the system (e.g., the configuration management engine 102 and/or the monitoring engine 104) may determine whether the computer system 106 (e.g., the configuration 108) violates one or more of the security goals 110. The security goals 110 may include business logic rules, such as business logic rules that a particular organization intends to implement in the computer system 106. In general, any individual business logic rule may include a criterion which, when satisfied, indicates that the business logic rule has been satisfied. A criterion, as that term is used herein, may be a simple (individual) criterion or a complex criterion including a plurality of criteria, which may be joined, for example, by Boolean operators (e.g., AND, OR, XOR) and/or logic (e.g., if/then logic) in any of a variety of ways.

Although the goals 110 are referred to herein as "security goals," the goals 110 may include goals other than security goals. Similarly, although security rules are examples of business logic rules as that term is used herein, business logic rules may include rules other than security rules. For example, the goals 110 may include compliance goals, governance goals, and attestation of process compliance goals. As a particular example, a company may have a change management process that requires configuration changes to be reviewed and approved before being implemented. The goals 110 may include one or more rules implementing this requirement. As a result, the system 100 will apply such rules to determine whether any particular configuration change has been reviewed and approved before allowing that configuration change to be implemented in the system 100. Although such rules are not strictly security-related, they still fall within the scope of the goals 110 of the present invention.

In general, the configuration management engine 102 receives data 106 representing a state of the computer system 118 (FIG. 2, operation 202). The state data 118 may include data representing a state of any one or more components of the computer system 106, such as a state of some or all of the configuration 108, a state of some or all of the components of the computer system 106 other than the configuration 108, or any combination thereof. The state data 118 may include data representing a current state of the computer system 106, data representing a potential future state of the computer system 106, or any combination thereof.

The configuration management engine 102 receives some or all of the security rules 110 (FIG. 2, operation 204). The configuration management engine 102 may receive the security rules 110 in any of a variety of ways. For example, some or all of the security rules 110 may be stored outside of the configuration management engine 102, in which case the configuration management engine 102 may receive some or all of the security rules 110 over a network and/or from external storage. Alternatively, for example, some or all of the security rules 110 may be contained within the configuration management engine 102, in which case the configuration management engine 102 may receive some or all of the security rules 110 by reading them from a memory within the configuration management engine 102.

The configuration management engine 102 establishes a particular perspective into the computer system 106 (FIG. 2, operation 206). The configuration management engine 102 may, for example, store data representing the established perspective in perspective data 120. Although the perspective data is shown in FIG. 1 as being contained within the configuration management engine 102, this is merely an example and not a limitation of the present invention. The perspective data 120 may, for example, be stored outside the configuration management engine 102, such as in the monitoring engine 104, in the computer system 106, in one or more components of the system 100 other than the computer system, the configuration management engine 102, and the monitoring engine 104, or any combination thereof. Although the perspective will be described in more detail below, one example of the perspective is an account of a user of the computer system 106, in which case establishing the perspective may involve logging into the user account or simulating logging into the user account.

More generally, a perspective into the computer system 106, as that term is used herein, refers to an actual or simulated set of access rights, permissions, and/or entitlements viewed in a particular context. Such a particular context may include, for example, the permissions and privileges of a given user, a given user role, or a given group or groups of users with respect to one or more resources in the computer system 106. For example, a perspective may be a particular user X, in which case establishing that perspective into the computer system 106 may include logging into user X's account in the computer system 106, such as through the use of OAuth, password credentials, API key, session identifier, cryptographic certificates, or other form of user-based or programmatic service authentication. As another example, a perspective may be established by analyzing an existing user's permissions, access rights, and entitlements, creating a duplicate account that mirrors them, and logging into that account. As another example, a perspective may be a particular user role Y, in which case establishing that perspective into the computer system 106 may include logging into a user account having role Y in the computer system 106, modifying the role of a user who is already logged into the computer system 106 to be or include role Y, or otherwise adopting the role of a user having role Y in the computer system 106. As yet another example, a perspective may be a set of access rights, permissions, and/or entitlements Z with respect to a particular set of resources in the computer system 106, in which case establishing that perspective into the computer system 106 may include logging to a user account having the set Z of access rights, permissions, and/or entitlements with respect to the particular set of resources in the computer system 106; modifying the account of a user who is already logged into the computer system 106 to have the set Z of access rights, permissions, and/or entitlements with respect to the particular set of resources in the computer system 106; or otherwise adopting the set Z of access rights, permissions, and/or entitlements with respect to the particular set of resources in the computer system 106.

The configuration management engine 102 determines whether the state of the computer system 106 (as represented by the state data 118) violates one or more of the security rules 110 from the established perspective (as represented by the perspective data 120) (FIG. 2, operation 208). Examples of ways in which this determination may be made will be described in detail below. As merely one example, the configuration management engine 102 may determine whether an attempt by a user who is logged in to a particular user account to access a particular resource (e.g., file) in the computer system 106 would violate one or more of the security goals 110.

Whether or not the state data 118 indicates that the state of the computer system 106 violates one or more of the security goals 110 from the perspective 120, the configuration management engine 102 may generate output 122 indicating whether the state data 118 indicates that the state of the computer system 106 violates one or more of the security goals 110 from the perspective 120. The configuration management engine 102 may, for example, provide such rule application output 122 to a system administrator or other user of the computer system 106. More specifically, if the configuration management engine 102 determines that the state data 118 indicates that the state of the computer system 106 does violate one or more of the security goals 110 from the perspective 120, then the configuration management engine 102 may generate the rule application output 122 to indicate that the state data 118 violates one or more of the security rules 110 from the perspective 120 (FIG. 2, operation 210). If, instead, the configuration management engine 102 determines that the state data 118 does not indicate that the state of the computer system 106 violates one or more of the security goals 110 from the perspective 120, then the configuration management engine 102 may generate the rule application output 122 to indicate that the state data 118 does not violate one or more of the security rules 110 from the perspective 120 (FIG. 2, operation 212).

If the configuration management engine 102 determines that the state data 118 violates one or more of the security rules 110 from the perspective 120, then then configuration management engine 102 may change the state of the computer system 106, as reflected in FIG. 1 by the providing of a state change message 124 from the configuration management engine 102 to the computer system 106 (FIG. 2, operation 214). In general, the state change message 124 may be implemented as any action taken by the configuration management engine 102 to change the state of the computer system 106, whether or not implemented as a message. The configuration management engine 102 may, for example, change the state of the computer system 106 so that the resulting state of the computer system 106 no longer violates at least one of the security rules 110, or so that the resulting state of the computer system 106 does not violate the security rule(s) which were determined to be violated in operation 208. If the violation identified in operation 208 was a violation of a potential future state of the computer system 106, then operation 214 may involve preventing that potential future state from being realized in the computer system 106, i.e., preventing the state of the computer system 106 from being changed to that potential future state, rather than changing the state of the computer system 106.

As described above, the security goals 110 may, for example, include business logic rules. Each such business logic rule may include both a criterion and a corresponding action, such that the business logic rule indicates that the action is to be performed if the criterion is satisfied (referred to herein as a "positive action"). In other words, a business logic rule may be of the form, "if <criterion> then <action>". As a result, if the system 100 (e.g., the computer system 106) determines that a criterion of a particular business logic rule is satisfied, then the system 100 may, in response to this determination, perform the corresponding action specified by the business logic rule. A business logic rule may include an action to be performed if the criterion specified by the business logic rule is not satisfied (referred to herein as a "negative action"). A business logic rule may, therefore, be of the form, "if <not criterion> then <negative action>" or "if <criterion> then <positive action>; if <not criterion> then <negative action>." In either such case, if the system 100 (e.g., the computer system 106) determines that a criterion of a particular business logic rule is not satisfied, then the system 100 may, in response to this determination, perform the (negative) action that the business logic rule specifies should be performed if the business logic rule is not satisfied.

One particular way in which a rule having both an action to be performed when a condition is satisfied (the positive action) and an action to be performed when the condition is not satisfied (the negative action) may manifest itself in the system 100 is as follows. As described herein, the system 100 may apply a business logic rule to the computer system 106 (e.g., the configuration 108) repeatedly over time. Assume that at a first time the system 100 applies the business logic rule to a first state of the computer system 106 at a first time and determines that the first state of the computer system 106 satisfies the criterion of the business logic rule. In response, the system 100 performs the positive action specified by the business logic rule to be performed when the criterion is satisfied. Then, the system 100 applies the same business logic rule to a second state of the computer system 106 at a second (later) time and determines that the state of the computer system 106 no longer satisfies the business logic rule at that later time. In response, the system 100 performs the negative action specified by the business logic rule to be performed when the criterion is not satisfied. In this way, the system 100 may perform the positive action specified by a business logic rule for as long as the state of the computer system 106 satisfies the business logic rule's criterion, and then perform the negative action specified by the business logic rule when the state of the computer system 106 no longer satisfies the business logic rule's criterion (or vice versa).

Business logic rules in the security goals 110 may, for example, implement any of the following functions, in any combination, by using appropriate criteria and corresponding actions:

Regulating access to information resources in the computer system 106 by various people, such as by including criteria specifying one or more particular roles, individuals (e.g., by username or real name), organizational hierarchies, employee types, license types, or other logical groupings, and by specifying actions indicating which resources such people should and/or should not have access to.

Provisioning or deprovisioning access to any one or more of the following within the computer system 106: computer systems, applications, software functionality (e.g., administrative functions), software code blocks, or code with particular characteristics (such as running in a high privilege level or system privilege level). Provisioning or deprovisioning access may be a condition of a business logic rule and/or an action of a business logic rule. For example, a business logic rule may include a condition which is satisfied when a user is provisioned with particular permissions (e.g., administrative permissions). As another example, a business logic rule may include an action which de-provisions the permissions which allow a user to delete a certain class or type of record in response to determining that the user has performed such deletion.

Usage of features that may impact enterprise policy, such as security controls in the areas of encryption of data, time-based access to systems or data, trusted or higher privilege of IP source networks, authentication settings. For example, a business logic rule may specify that if data is viewable by a particular user in a cleartext format, then a particular action should be performed. Examples of such data include one or more fields, one or more records, a confidential report, or a folder containing one or more files. Examples of the particular action to perform include outputting an alert to the security team or IT admins, removing a security permission from the user to whom the data is viewable, and adding an encrypted permission to the data that is viewable by the user.

Detection of violations of data governance and privacy policies (HIPAA, GDPR, PCI-DSS, FedRAMP, COPPA, etc.). and/or ongoing controls assurance of same.

As described above, the configuration management engine 102 may receive the state data 118 as input, where the state data 118 may represent the state of some or all of the computer system 106 (e.g., the configuration 108). The configuration management engine 102 may receive the state data 118 at any particular time and perform the functions disclosed herein at that particular time or shortly thereafter. Because the state of the computer system 106 (e.g., the state of the configuration 108) may change over time, the configuration management engine 102 may receive a plurality of instances of the state data 118 over time, each of which may reflect a different state of the computer system 106 (e.g., the configuration 108) at a corresponding time. The configuration management engine 102 may receive a first instance of the state data 118 (representing a first state of the computer system 106) at a first time, and perform the functions disclosed herein in connection with that first instance of the state data 118. The configuration management engine 102 may receive a second instance of the state data 118 (representing a second state of the computer system 106) at a second time, and perform the functions disclosed herein in connection with that second instance of the state data. As this implies the configuration management engine 102 may perform the functions disclosed herein on different states of the computer system 106 (e.g., the configuration 108) as those states change over time. Such changes may include not only changes to values of existing parameters within the computer system 106 (e.g., the configuration 108), but also the addition of new parameters (with corresponding values) to the computer system 106 (e.g., the configuration 108) and the removal of existing parameters from the computer system 106 (e.g., the configuration 108).

The occurrence of any of a variety of triggers may cause the configuration management engine 102 to receive a particular instance of the state data 118 at a particular time. For example, a user (e.g., system administrator) may provide an instruction to the configuration management engine 102, in response to which the configuration management engine 102 may retrieve an instance of the state data 118 representing a current state of the computer system 106 at that time. As another example, the configuration management engine 102 may periodically retrieve instances of the state data 118 representing states of the computer system 106 at corresponding times, or in response to detecting that a change has been made to the computer system 106 or that a change has been proposed to the computer system 106.

If the system 100 incorporates a release process in which changes to the computer system 106 are created in test or integration environments before being migrated to the computer system 106, then changes to the computer system 106 (in the form of updated instances of the state data 118) may be analyzed by the configuration management engine 102 during any one or more of the following times: during the creation or packaging of such changes on the test/integration systems, during a test phase after the creation of such changes, during a migration or transfer of such changes to the next system in the release process (e.g., integration or production), upon receipt by the next system in the release process, or at any point before or during the application of such changes to the computer system 106.

A full analysis of the entire computer system 106 (e.g., the entire configuration 108) by the configuration management engine 102 may also be triggered on demand by a system administrator or user, on a schedule, as a random sampling, in response to changes to the security goals 110, or in response to detection by the system 100 of an external event, such as an audit or API call. Such a full system analysis may be used to detect changes to the computer system 106 that were previously not detected by the configuration management engine 102 and/or to detect other changes to system states in the computer system which violate one or more of the security goals 110. For example, a full system analysis of the entire computer system 106 (e.g., the entire configuration 108) may detect that the computer system 106 or a change to the computer system 106:

bypasses a release process;

is now relevant due to changes in the security rules 110 rather than changes to the computer system 106;

is due to software updates that changed behavior of the computer system 106 under a given state of the configuration 108;

was made maliciously and/or by unauthorized parties;

was released through unmonitored channels;

is contained within opaque delivery mechanisms or packages with contents not immediately able to be analyzed; and/or was impacted by recent security discoveries, such as vulnerabilities, exploits, or techniques.

The configuration management engine 102 may analyze the computer system 106 explicitly and/or implicitly. For example, examples of explicit analysis that the configuration management engine 102 may perform of the computer system include directly accessing (e.g., opening, reading from, and/or writing to) files, settings, and/or configuration objects in the computer system 106. The configuration management engine 102 may use any information obtained in this way to identify the code, features, information resource accesses, and other aspects of the computer system 106 using the same or similar logic that the computer system 106 would itself use to interpret the configuration 108. One way in which such an analysis may be used, as will be described in more detail below, is to calculate the effect that a set of changes to the configuration 108 would have on the configuration 108, and to translate it to the behavior of the computer system 106 with respect to the configured criteria.

Examples of implicit analysis that the configuration management engine 102 may perform of the computer system 106 include the following. The configuration management engine 102 may provide a stimulus 126 to the computer system 106 (e.g., the configuration 108) from a particular perspective. The configuration management engine 102 may receive data 128 representing a response to the stimulus 126, such as data representing a change to the configuration 108 in response to the stimulus 126. The response data 128 may, for example, be contained within an instance of the state data 118. The stimulus 126 may be an actual stimulus provided by the configuration management engine 102 to the computer system 106 or a potential (e.g., proposed or simulated) stimulus provided by the configuration management engine 102 to the computer system 106. Any description of the stimulus 126 herein should be understood to include both instances of actual stimuli and potential stimuli.

An example of the stimulus 126 is an action performed by the configuration management engine 102 from a particular perspective in connection with the computer system 106, such as an action involving accessing (or attempting to access) one or more resources within the computer system 106. The configuration management engine 102 may perform such an action from any kind of perspective, as that term is used herein. Examples of perspectives include a particular user, role, group, license type, or other entity representing one or more logical perspectives into the computer system 106. The configuration management engine 102 may, for example, provide the stimulus 126 from within a particular logged-in user's account in order to provide that stimulus 126 from the perspective of that particular user. As a particular example, the configuration management engine 102 may attempt to infer the configuration 108 with respect to access to the computer system 106 by entities not directly employed by the organization that owns the computer system 106 by performing such actions from the perspective of (e.g., while logged into the computer system 106 as) one or more external users, such as anonymous or unauthenticated users, partners, guests, customers, portal users, or community members. Examples of such actions that may be performed (i.e., stimuli that may be provided) by the configuration management engine 102 in connection with the computer system 106 include any one or more of the following, in any combination:

Enumerating, querying, searching, accessing, or altering information resources in the computer system 106 to infer the access granted by the computer system 106 to relevant entities. Access may include, for example, the ability to view information resources and permissions, such as the ability to edit, delete, publish, provision, deprovision, or otherwise interact with such resources. For example, the configuration management engine 102 may attempt to determine the access privileges of a particular perspective in the computer system 106 by attempting to obtain access using a plurality of different access privileges, determining which of those attempts were successful, and identifying the access privileges associated with the successful attempts as the access privileges that are associated with the particular perspective.

Attempting to run, execute, or access code blocks, features, or functionality of the computer system 106 which may themselves be privileged or lead to the access of privileged data, code blocks, features, or functionality.

Calling software functions of a user interface or API of the computer system 106, and analyzing the results to determine discrepancies in data or access controls.

Attempting to make a direct or indirect network connection to a system or service in the computer system 106.

Attempting, from within the computer system 106, to access or log into a service from a particular IP network; or attempting to log into a service within the computer system 106 from outside the computer system 106.

Attempting, from within the computer system 106, to access or log into a service with a particular client profile, browser fingerprint, or other user-agent, to appear as trusted and/or legitimate; or attempting to access or log into such a service within the computer system 106 from outside the computer system 106.

Attempting, from within the computer system 106, to access or log into a service at a particular time; or attempting to access or log into a service within the computer system at a particular time from outside the computer system 106.

Attempting, from within the computer system 106, to access or log into a service with a particular set of credentials access token(s); or attempting to access or login into a service in the computer system 106 with a particular set of credentials or access token(s) from outside the computer system 106.

Attempting to perform a security-relevant action within the computer system 106 that should be protected by a security control (e.g., change a password to a password that does not conform to a policy of the computer system 106).

Attempting to perform an action within the computer system 106 that would indicate the assignment or revocation of a permission, grant, membership, subscription, license, or other attribute.

Enumerating packages, groupings of changes, configuration differentials, audit logs of changes, or other evidence of change within the computer system 106.

Attempting to access particular data fields within the computer system 106 to infer data field security assignments.

Attempting to perform actions within the computer system 106 that would indicate the presence of new types of data, feature sets, or functionality.

The configuration management engine 102 may use machine learning (e.g., supervised, unsupervised, or hybrid machine learning) techniques to predict a priori whether a particular change, upgrade, or patch to the configuration 108 (such as any of the actions/stimuli described above) will (or is likely to) improve, degrade, or otherwise alter the effective access policies and data access controls of the computer system 106. One example of such a change is a change to the security rules 110, such as the addition of a new rule to the security rules 110, the modification of an existing rule in the security rules 110, or a removal of a security rule from the security rules 110. Any of the techniques disclosed above for performing explicit and/or implicit analysis of the configuration may be used to generate inputs to machine learning techniques in embodiments of the present invention. Machine learning, which is an example of predictive analysis that the configuration management engine 102 may perform, may be performed in three modes, which may be performed individually or in any combination in embodiments of the present invention:

- The predictive analysis engine may receive as input the stated security and governance goals of an organization or computer system (e.g., the security rules 110). Such goals may, for example, express the desired effective access policy of the computer system 106 and the predictive analysis engine would determine whether a particular modification to the configuration 108 would violate (or is likely to violate) that policy. An example of an effective access policy is that no anonymous access to a particular portal in the computer system 106 is to be permitted. In practice, various aspects of the configuration 108 (e.g., a plurality of code, configuration settings, and permissions) may act in concert to create and enforce that effective access policy.
- The predictive analysis engine may perform historical analysis of the configuration 108, such as log files, configuration changes, package enumerations, and data inspection. The sets of information analyzed by the predictive analysis engine for this purpose may be specific to a particular organization, computer system, or groups of systems; an aggregated model across disparate organizations using the same (or substantially similar) computer systems; and/or an aggregated model of a logical organization (or group of organizations) across disparate computer systems.
- The predictive analysis engine may receive as input the actual or proposed changes to the computer system 106 (including the configuration 108) relative to the existing computer system 106 (including the existing configuration 108).

The security goals 110 as described above may be represented and stored in any form. Such security goals 110 may be any security goals that are relevant to the configuration 108 of the computer system 106. The security goals 110 may, for example, be stored in a form that includes a semantic expression of such goals, a declarative expression of such goals, or any combination thereof. The security goals 110 may be application agnostic and/or platform agnostic. An administrator or user of the system 106 may express the security goals 110 and outcomes of an effective access policy without needing to know or understand the details and particular settings necessary to create, deploy, manage, or monitor the effective access policy of the computer system 106. In some instances of the computer system 106, such as if the computer system 106 is or includes a cloud-based or Software-as-a-Service (SaaS) system, the security goals 110 may focus on qualities of accessible data, resource access, features, plugins, packages, and/or particular options of the configuration 108. In other instances of the computer system 106, such as a product produced using embodiments of the present invention, the security goals 110 may focus on the accessibility of features that may not be provisioned or released, whether a release meets criteria defined by third party plugins, such as static analysis tools, or code quality based on elements included in the release.

The term "effective access policy" refers to the actual access that a user has to a resource within the computer system 106, which may result from a combination of a plurality of rules, settings, permissions, and entitlements. An effective access policy is the summation of all of those different "access grants" that determine the user's access. For example, a user of the system 100 may wish to enforce the following effective access policy: "This folder of quarterly sales forecasts should always be encrypted, and only members of the Sales Executive Leadership team should have the ability to decrypt and view these forecasts." In practice, such a policy may be implemented by a combination of different settings, groups, and permissions. A user may not (and often does not) understand the nuances of the computer system 106 and the complicated ways in which permissions and settings interact to grant or restrict data access. Embodiments of the present invention record, analyze, and understand these complicated and nuanced interactions, translating the user's intent into a correct and complete implementation of the user's desired effective access policy.

Embodiments of the present invention allow a user to express an effective access policy (e.g., in the form of the security rules 110) without needing to enumerate, analyze, or even know or understand all of the various combinations of settings, parameters, attributes, etc., of the computer system 106 that could degrade, violate, or alter that effective access policy. This represents a significant advance over the state of the art, which currently requires users to enumerate such combinations if they are to prevent security gaps. In contrast, embodiments of the present invention enable the user to express their security goals at a higher level of abstract, and leave it to embodiments of the present invention to identify those combinations of settings, parameters, attributes, etc., of the computer system 106 which are required to implement those security goals.

As a particular example, assume that a class of users is represented by Perspective A, and that Perspective A has the security permission to read all data in a particular data repository. Further assume, however, that the data repository only contains reports and that Perspective A does not have the license entitlement to view, create, or access reports. As a result, even though Perspective A has the security permission to read reports, Perspective A effectively has no access to any reports in the data repository because Perspective A does not have the license entitlement to access reports. In this example, the effective access policy that applies to Perspective A prevents Perspective A from accessing reports in the data repository, as the result of a combination of the security permissions of Perspective A and the license entitlements of Perspective A. A system which only analyzed the security permissions or the license entitlements of Perspective A would not determine that Perspective A effectively lacks access to the reports in the data repository. In contrast, embodiments of the present invention would determine that Perspective A effectively lacks access to the reports in the data repository because embodiments of the present invention would take into account both the security permissions and the license entitlements of Perspective A.

Now assume that Perspective A is granted a license entitlement to use the report feature of the system 100. As a result, Perspective A will have the ability to access every report in the data repository, including highly confidential reports. Embodiments of the present invention can determine that Perspective A now has this ability by detecting the change in Perspective A's license entitlements and combining the effect of that change with Perspective A's current security permissions.

Any one or more of the rules in the business rules 110 may apply in all cases or be dynamically added to the business rules 110 based on a qualifying pre-assessment of the configuration 108 and/or the computer system 106. For example, a release including software code or a sensitive data resource may be required to meet additional qualifications, such as a positive third party assessment or a check against a whitelist of allowed integrations.

The business rules 110 may include one or more criteria, which the configuration management engine 102 may apply to the computer system 106 (e.g., the configuration 108) and/or to actual or potential changes to the computer system 106 (e.g., the configuration 108) to determine whether the computer system 106 and/or actual or potential changes to the computer system 106 satisfy those criteria. Any particular criterion may be positive or negative. A positive criterion indicates that a policy is violated if the criterion is satisfied. A negative criterion indicates that a policy is violated if the criterion is not satisfied. Examples of such criteria which may be included within the business rules 110 include, but are not limited to, criteria which specify:

- Data records which are accessible or permitted to be viewed.
- Permissions which particular data records are permitted to have (e.g., create/edit/delete permissions).
- Actions which are permitted to be applied to particular data records (e.g., read, write, publish, download).
- Thresholds on the numbers of records permitted to be accessed or a change to permissions on a threshold of records. This may, for example, be expressed as an absolute number of records, an increase or decrease expressed as a percentage or a multiple of a standard deviation, or other expression of quantitative change.
- Values associated with particular fields or other data structures. For example, a criterion may specify that a particular data field may only be accessed if it has a value greater than ten thousand.
- Permissions, settings, features, feature sets, functionality, or configuration assignments that are assigned, not assigned, provisioned, or not provisioned.
- Files available, based on a reference to the file, patterns within the file, or other attributes of the file.
- Groups available, including groups of users, social-style communication groups, or other logical groupings of resources.
- The presence of new objects or fields made available to a perspective or enabled within a configuration change.
- The creation of new user profiles, permissions, sets of permissions, roles, or other logical groupings of permissions or accesses.
- The assignment of user profiles, permissions, sets of permissions, roles, or other logical groupings of permissions or accesses.
- The changing object, class, record, data, or resource access control models. For example, switching from a default of "deny access" to a default of "allow access" as a control model for a data object, or security attributes, filters, or decorators changing on an API endpoint.
- The use of new features or services within a product, such as a feature set within an application or a class of product in an infrastructure-as-a-service offering (e.g., the new use of S3 in the Amazon Web Services (AWS) product suite).
- Accessibility of an application resource, data resource, feature, software component, permission, or other entity, either from a new geolocation from where said resource was not previously available, or the identification of a resource offered from a new geolocation.
- Accessibility of data labeled with or pertaining to a certain geolocation from configured geolocation (inclusively or exclusively). For example, the ability to access the personal information of an EU citizen from outside of the EU or the ability to access the information of an EU-based customer from outside the EU.
- Accessibility of an application resource, data resource, feature, software component, permission, or other entity from a particular application, browser, or other user agent.
- Differences in effective accessibility of a particular application resource, data resource, feature, software component, permission or other entity when conflicting or hierarchical access controls are in place. For example, GeoLocation controls that become ineffective when an Admin or Support person uses LoginAs. Or user manual sharing which trumps criteria based sharing.
- Efficacy of encryption, tokenization, or other obfuscation techniques on target data or data sets.
- The creation of external portals, communities, or other resource and data offerings intended to be exposed to external users or a new class of users such as customers, partners, contractors, etc.
- The changing of file, document, or folder permissions (e.g. make public, enable external sharing, or other change to its overall security model).
- The changing of security features or settings such as logging, identity providers, or allowable source IP addresses of users.
- The change in accesses to data labeled with information classification or security labels.
- The change in usage or exposure to software components having been previously identified as containing or likely to contain vulnerabilities.
- The change in usage or exposure to software components having been identified by reference as likely to contain vulnerabilities in the future due to their past history.
- The change in usage or exposure to data, resource, features or software components having been tagged, labeled, or otherwise identified by a pluggable or third party module performing pattern matching, risk or sensitivity scoring, or other pluggable analysis schemes.
- Changes to software modified times that may indicate that an update occurred.
- Changes to software having been previously identified by reference, file contents, software pattern, or file name pattern that are known to be high risk, complex, or otherwise security sensitive.
- Changes to software quality or security.
- Changes to software runtime context. For example, whether a piece of software or feature runs in the context of a system process, the calling order, or changes to automatic enforcement of user level access to data and data fields.

Changes to code characteristics, software libraries called, licenses of software used, callouts to other web-based resource, database access or mode of database access (e.g. synchronous and transactional vs asynchronous), passing of credentials or authentication tokens within the software or to third parties, or use of a given set of stored credentials, identities, or software accounts.

Based on the results of software sandboxing and dynamic analysis.

Changes a third party software bundle, library, package, or integration.

The introduction of a software bundle, library, package or integration owned, operated, or developed by a third party and whether that third party or specific usage has been approved through a third party review/approval process.

Changes to HTTP callout destinations.

Whether a feature, geo, service, third party is approved for use with a given customer based on their licensing, contract, agreement, or other customer status.

Whether data from one customer changes with respect to availability or permission from other customers or otherwise unauthorized perspectives. This may include direct access as well as changes to the allowance of references to customer data in a different logical organization (or otherwise an unauthorized target) within other data objects (i.e. foreign keys or other reference).

The use of artificial intelligence or machine learning to identify changes that are likely unwanted, mistakes, or insecure.

The use of behavior analysis of other software systems and customers to identify changes that are likely unwanted, mistakes, or insecure.

The use of a set of recommended configurations or criteria offered by the invention that can be or are recommended to be used by a customer, varying by the attributes of the target system. For example, a set of recommendations can be supplied to all configurations targeting an Amazon Web Services software system.

The use of a set of recommended configurations or criteria supplied by a vendor of a software system. These criteria can be supplied by the vendor through an out of band process such as a published configuration file or tool, passed through a business relationship, an API, derived from the target software product, or inferred based on the default settings of the target platform or software product.

The use of a set of recommended configurations or criteria supplied by a plugin or package outside of the invention that serves as a value-added knowledge base of positive or negative configurations for a target software platform, product, or system.

The ability to group analysis perspectives into one or more logical groupings for the purpose of applying criteria to the groupings instead of directly to the perspectives. These groupings may represent functional qualities such as Internal vs External perspectives, or be any other logical grouping.

Whether a change or update to a software system causes a given, known, or previous configuration to result in different software behavior than before the change.

Information based on the querying or communication with a software agent installed on the target systems.

The presence of flaws in application code, third party libraries, or trusted components or services which may allow for a malicious party to bypass or defeat access controls which would otherwise be effective.

The presence of flaws or expiration of effectiveness of infrastructure security controls or settings upon which the application, resource, or component relies for inherited security. SSL certificate, OAuth token, CSP/Flash policy, Change in domain sandboxing, etc.

As described above, the configuration management engine 102 may apply the business rules 110 to the computer system 106 and produce output 114 representing the results of applying the business rules 110 to the computer system 106. The configuration management engine 102 may produce the output 114 for informational purposes. Additionally or alternatively, the configuration management engine 102 may take action in response to generating the output 114, such as by performing one or more of the following, in any combination:

Changing the computer system 106 (e.g., the configuration 108) to eliminate any aspects of the computer system 106 which the configuration management engine 102 has determined violate one or more of the security goals 110.

Disabling any aspects of the computer system 106 which the configuration management engine 102 has determined violate one or more of the security goals.

Reversing (e.g., undoing) any actual changes that have been made to the computer system 106 and which the configuration management engine 102 determined violate the business rules 110.

Preventing any proposed changes to the computer system 106 which the configuration management engine 102 has determined would violate the business rules if they were made to the computer system 106, even though such changes have not been made to the computer system 106.

Embodiments of the present invention which function in a multi-tier deployment may focus on performing all qualifying steps or processes identified by the analysis before a configuration change is released to the production environment. Such embodiments may:

dynamically add a confirmation or notice step to the author of the changes or administrators and interested parties in the change process. These confirmations are intended as a dynamic insertion of an explicit confirmation step into the release process so authoring or interested parties in the change process take positive action to confirm changes that may meet certain configured criteria. The step may be performed on an individual change or during a review of qualifying changes that are confirmed in bulk.

Signal or start an assessment of the changes via an external product, application, or process. For example, qualifying changes may result in an action that triggers external software static analysis of a system or alerts an external team of the need to review a system, possibly via email or a ticketing system.

Signal or start a business process to perform additional actions such as a third party security assessment of a new vendor integrated with the target or whose software libraries and packages may be included, the collection of standard audit reports such as SOC1/SOC2 from a new vendor, or other business process to verify that the target system(s) remain in compliance with organization goals.

- Detect a vendor or third party attestation of a set of changes, in the form of a digital signature, referencing publication, accompanying report, or other evidence of third party attestation.
- Ordering and displaying changes based on criticality, importance, or other selectable criteria where changes or groups of changes can be highlighted, ordered, and restructured to bring attention to important characteristics.
- Inject an approval process where a set or subset of changes require explicit approval by a configured stakeholder before continuing in the release process. Approvers can be configured by the triggering criteria, location, nature of the change, or other attribute.
- Inject a notification process where a set or subset of changes require explicit approval by a configured stakeholder or computer process before continuing in the release process. Targets of notifications can be configured by the triggering criteria, location, nature of the change, or other attribute.
- Allow changes to be associated with approval evidence such as a ticket number, link, email, signature (digital or otherwise), or other evidence.
- Block target changes from being incorporated into a package or grouped into change set, as a permanent block until changes are resolved or until a business process like approval or positive results from an integration.
- Block the release process until criteria and actions are satisfied.
- Begin a workflow of steps for the changes to follow before advancing in the release process.
- The addition of attributes, tags, or internal values to a set of changes to track attributes of the changes, approval status, or other quality. This may serve as a "quick view" of the status of changes or be operating on by a later computer or business process.
- Tracking and recording the flow of changes through the multi-tier system and the actions taken during the release process.
- Detecting when previously approved or cleared changes are installed in a production environment, possibly closing the approval record or other tracking record.
- In the production environment, highlight those changes that have been previously reviewed and their current status, whether by showing applied tags, attributes, or a history of the release steps that have occurred.
- To require, queue, or create a similar (in design or effect) change set in an accompanying or otherwise related system. The purpose of this action could be to force synchronization between systems, enforce feature parity, push changes back into test systems from their production counterparts, or other action appropriate for multiple systems.
- To rollback, delete, or otherwise revert the changes.
- Instruct an installed agent on a target system to accept changes or perform an action.
- Generate formatted evidence reporting of aggregate security controls or effective security access policy dynamically or on a scheduled basis.
- Perform the evidence reporting above using an externally defined list of security controls, configurations, or evidentiary requirements paired with the technical particulars and settings specific to the application(s) or computer system(s).
- Offer or require additional inputs for the changes to include documenting the owner, purpose, change justification, references to policy/approvals, requestor, company, or other information. These data may be specific to individual elements of the configuration or cover the changes as a whole.

The monitoring engine 104 may operate in tandem with or independently of the configuration management engine 102. The monitoring engine 104 may, for example, support some or all of the capabilities of the configuration management engine 102 and may also explicitly analyze the configuration 108 or make inferences about the configuration 108 in the same or similar ways as disclosed herein in connection with the configuration management engine 102.

The monitoring engine 104 may detect changes to the computer system 106 that appear in production but which bypassed detection by the configuration management engine 102 or which otherwise do not bear evidence of having been assessed by the criteria in the business rules 110 or having been processed otherwise by the configuration management engine 102. This may occur in any of a variety of ways. For example, the operator of the computer system 106 may make a change or upgrade to the computer system 106 which alters the behavior of an existing security control, parameter, or setting in the computer system 106, such as by design or as the result of a software bug. Such an alteration in behavior may bypass detection by the configuration management engine 102. As another example, an administrator of the computer system 106 may bypass the configuration management engine 102 and directly modify the computer system 106 using, for example, administrator privileges. As yet another example, installed applications executing on the computer system 106 may have been modified or be malfunctioning in such a way that impacts the effective security policy or violates the stated security goals 110 of the user, but which evades detection by the configuration management engine 102.

The monitoring engine 104 may create and store a historical record 116 of changes to the computer system 106 that have been detected by the configuration management engine 102, such as changes causing a resulting configuration, access, allowance, feature, or other change to the computer system 106. This record 116 may, for example, be used for forensics purposes to identify the scope and exposure period of a change, to identify the person or process responsible for a change, to compare differences in configuration, software behavior, or data access between points in time or be incorporated into subsequent analysis to show change drift or differentials from a given point in time or release.

The monitoring engine 104 may enable an author of a proposed or applied change set to the computer system 106 to run an on-demand assessment of such a change set and to calculate the effects the change set would have as compared to a baseline selected from any previous assessments. The results of the calculations may be provided directly in the application, by highlighting or otherwise changing the display interface of change set in the target software to reflect important qualities/attributes/results, via a report, or other delivery mechanism.

The monitoring engine 104 may compare the results of assessments of related systems by the configuration management engine 102 to show skew, drift, or the absence/existence of configurations that may be desirable or undesirable.

The monitoring engine 104 may retroactively assess the computer system 106 on a newly identified best practice, discovery, vulnerability, or other element whose presence or absence may be identified from an explicit or inferred assessment of the computer system 106.

The monitoring engine 104 may perform any of the functions disclosed herein on a continuous, periodic, or on-demand basis; be triggered to perform any of the functions disclosed herein by the application of changes or by external systems or events such as a known deployment of new software by a vendor; or any combination thereof.

Although various elements of the system 100, such as the configuration management engine 102 and the monitoring engine 104, are shown as elements distinct from the computer system 106, this is merely an example and not a limitation of the present invention. Any elements disclosed herein of embodiments of the present invention may be entirely or partially incorporated within the computer system 106, such as in the form of a computer and/or application in the computer system 106. Elements of the system 100 (such as the configuration management engine 102 and the monitoring engine 104) may be implemented in a system that is external to the computer system 106 (or any one or more computer systems within the computer system 106).

Existing product monitoring solutions do not focus on data exposure for the vast majority of confidential information and, if they can, do allow institutions to define and enforce a policy about the allowable configurations of these systems. Instead, they focus on things like new servers appearing, ports being open on servers, software daemons becoming out of date with known vulnerabilities, etc. There is a field of data-centric monitoring called “data loss protection” or “data loss prevention” (DLP) that attempts to identify confidential data being leaked by watching network traffic for specific known patterns like credit card or social security numbers, or flagging data that is being sent to unauthorized destinations based on country or IP ranges. DLP fails in that it only identifies pre-determined patterns in the data as it travels over the network—such as data that is in the process of being stolen—and not the potential data that could be exposed or other characteristics that could lead to data breaches. As a result, DLP identifies security gaps when such gaps have already been exploited. In contrast, embodiments of the present invention are capable of identifying potential future changes to effective security policies before such changes occur, and of preventing such changes from occurring, so that security gaps can be prevented even from occurring. For example, embodiments of the present invention can identify that new or different types of data suddenly have been exposed to a particular type of user, that certain fields are suddenly available if explicitly requested, or that increased numbers of data records are available. Most confidential company information does not contain SSNs or credit card numbers that are easily matched based on patterns, so DLP fails for the majority of data that companies care about.

Another class of product is called a vulnerability scanner. Those typically look for known-vulnerable software versions or behaviors that indicate the presence of a specific class of software vulnerability.

A related product area are configuration display tools that attempt to take a configuration and show the high level access by group or profile. While these tools can often display a grid of groups/profile and high level permissions for each data object such as Read/Create/Update/Delete, they fail in two areas.

The first is that a given user’s perspective is often a combination of permissions, groups, roles, or other allowances (both additive and subtractive). The net effect of the totality of these allowances for each specific and unique combination must be calculated or observed. Differences in these combinations typically means that each user has a slightly different effective access policy that leads to unexpected data access.

The second shortcoming of configuration management tools is that they are typically simple information grids and fail to take into consideration a policy, accepted/good practices, machine learning, or other elements to flag or block those configurations that would create data access violations or potential data breaches. These tools also lack key integrations such as differential assessment between different points in time or the ability to intervene in the change process to block or change the display of problematic changes.

Cloud Access Security Broker (CASB) is another related product area. CASBs often perform functions similar to DLP but add in cloud management concepts such as user single sign on, authentication, log aggregation, and various forms of network-based traffic gateways. A key differentiation with the policy-enforcing traffic gateways is that these gateways attempt to block or restrict violating data as it travels over the network instead of focusing on securely configuring the end systems to prevent the leakages.

Embodiments of the present invention may operate in a deployment model which does not use a multi-tier release approach. In such embodiments, the configuration management engine 102 analyzes inbound or pending changes to the computer system 106. In such embodiments, the configuration management engine 102 may perform any of the functions described herein in connection with a multi-tier model but for queued, pending, or proposed changes; or when the configuration management engine 102 has detected that actual changes have been made to the computer system 106.

For example, if the computer system 106 uses a multi-tier release process (e.g., testing followed by production), then the configuration management engine 102 may perform its analysis in a suitable test environment to simulate the effect of changes to the production environment of the computer system 106. If such a test environment is used, the system 100 may map production environments to their associated test environments, and map perspectives configured in a production environment to their counterparts in one or more test environments in order to correctly simulate the results in a production environment. It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the computation of many previous analyzed states of the computer system 106, and the corresponding results of analyzing various access perspectives with respect to each of those previously analyzed states can be performed in near real time by embodiments of the present invention, but would require many hours or days to perform manually. Additionally, the detection of a security violation or potential for unauthorized data access is most valuable when it is concurrent (or nearly so) to the precipitating action which resulted in the violation. This rapid computation and continuous monitoring is only practical when implemented by a computer. Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions tangibly stored in at least one non-transitory computer-readable medium, the method comprising:

(1) receiving data representing a plurality of security rules;

(2) at a configuration management engine, establishing a perspective into the computer system, comprising logging into the computer system using a particular set of privileges, the particular set of privileges including at least one of access rights, permissions, and entitlements associated with at least one user;

(3) at the configuration management engine, changing the state of the computer system from the perspective to create a modified state of the computer system, comprising providing a stimulus to the computer system from the established perspective;

(4) receiving data representing the modified state of the computer system;

(5) determining, based on the plurality of security rules and the data representing the modified state of the computer system, whether the modified state of the computer system violates at least one of the plurality of security rules from the established perspective; and (6) generating output indicating whether the modified state of the computer system violates at least one of the plurality of security rules from the established perspective.

2. The method of claim 1, further comprising:

(7) performing an action in the computer system in response to determining that the modified state of the computer system violates at least one of the plurality of security rules from the established perspective.

3. The method of claim 2, wherein performing the action in the computer system comprises changing the modified state of the computer system.

4. The method of claim 2, wherein (7) comprises changing the modified state of the computer system to a second state so that the second state does not violate the at least one of the plurality of security rules from the established perspective.

5. The method of claim 1, wherein the modified state of the computer system comprises a potential state of the computer system, wherein (4) comprises simulating changing the state of the computer system from the perspective to create the modified state of the computer system, and wherein the method further comprises:

(7) preventing the computer system from being put into the potential state in response to determining that the modified state of the computer system violates the at least one of the plurality of security rules from the established perspective.

6. The method of claim 1, wherein the modified state of the computer system comprises a potential state of the computer system, and wherein (5) comprises using machine learning to predict whether the potential state would violate at least one of the plurality of security rules from the established perspective.

7. The method of claim 1, wherein (5) comprises determining whether the modified state of the computer system satisfies a criterion of at least one of the plurality of security rules.

8. The method of claim 1, wherein providing the stimulus to the computer system comprises attempting to access a resource in the computer system from the established perspective.

9. The method of claim 1, wherein the data representing the modified state of the computer system comprises data representing a configuration of the computer system.

10. The method of claim 1, wherein the state of the computer system comprises an actual state of the computer system, and wherein changing the state of the computer system from the perspective to create a modified state of the computer system comprises changing the actual state of the computer system from the perspective to create an actual modified state of the computer system.

11. The method of claim 10:

wherein (5) comprises determining that the modified state violates at least one of the plurality of security rules from the established perspective, and wherein the method further comprises:

(7) changing the modified state of the computer system from the perspective to create a further modified state of the computer system, wherein the further modified state does not violate the at least one of the plurality of security rules from the established perspective.

12. The method of claim 1, wherein the state of the computer system comprises a simulated state of the computer system, and wherein changing the state of the computer system from the perspective to create a modified state of the computer system comprises changing the simulated state of the computer system from the perspective to create a simulated modified state of the computer system.

13. The method of claim 1, wherein the at least one user consists of one user, and wherein logging into the computer system using the particular set of privileges comprises logging into an account of the one user.

14. A system comprising at least one non-transitory computer-readable medium containing computer program instructions executable by at least one computer processor to perform a method, the method comprising:

(1) receiving data representing a plurality of security rules;

(2) at a configuration management engine, establishing a perspective into the computer system, comprising logging into the computer system using a particular set of privileges, the particular set of privileges including at least one of access rights, permissions, and entitlements associated with at least one user;

(3) at the configuration management engine, changing the state of the computer system from the perspective to create a modified state of the computer system, comprising providing a stimulus to the computer system from the established perspective;

(4) receiving data representing the modified state of the computer system;

(5) determining, based on the plurality of security rules and the data representing the modified state of the computer system, whether the modified state of the computer system violates at least one of the plurality of security rules from the established perspective; and (6) generating output indicating whether the modified state of the computer system violates at least one of the plurality of security rules from the established perspective.

15. The system of claim 14, wherein the method further comprises:

(7) performing an action in the computer system in response to determining that the modified state of the computer system violates at least one of the plurality of security rules from the established perspective.

16. The system of claim 15, wherein performing the action in the computer system comprises changing the modified state of the computer system.

17. The system of claim 15, wherein (7) comprises changing the modified state of the computer system to a second state so that the second state does not violate the at least one of the plurality of security rules from the established perspective.

18. The system of claim 14, wherein the modified state of the computer system comprises a potential state of the computer system, wherein (4) comprises simulating changing the state of the computer system from the perspective to create the modified state of the computer system, and wherein the method further comprises:

(7) preventing the computer system from being put into the potential state in response to determining that the modified state of the computer system violates the at least one of the plurality of security rules from the established perspective.

19. The system of claim 14, wherein the modified state of the computer system comprises a potential state of the computer system, and wherein (5) comprises using machine learning to predict whether the potential state would violate at least one of the plurality of security rules from the established perspective.

20. The system of claim 14, wherein (5) comprises determining whether the modified state of the computer system satisfies a criterion of at least one of the plurality of security rules.

21. The system of claim 14, wherein providing the stimulus to the computer system comprises attempting to access a resource in the computer system from the established perspective.

22. The system of claim 14, wherein the data representing the modified state of the computer system comprises data representing a configuration of the computer system.

23. The system of claim 14, wherein the state of the computer system comprises an actual state of the computer system, and wherein changing the state of the computer system from the perspective to create a modified state of the computer system comprises changing the actual state of the computer system from the perspective to create an actual modified state of the computer system.

24. The system of claim 23:

wherein (5) comprises determining that the modified state violates at least one of the plurality of security rules from the established perspective, and wherein the method further comprises:

(7) changing the modified state of the computer system from the perspective to create a further modified state of the computer system, wherein the further modified state does not violate the at least one of the plurality of security rules from the established perspective.

25. The system of claim 14, wherein the state of the computer system comprises a simulated state of the computer system, and wherein changing the state of the computer system from the perspective to create a modified state of the computer system comprises changing the simulated state of the computer system from the perspective to create a simulated modified state of the computer system.

26. The system of claim 14, wherein the at least one user consists of one user, and wherein logging into the computer system using the particular set of privileges comprises logging into an account of the one user.

* * * * *